Figure 1:
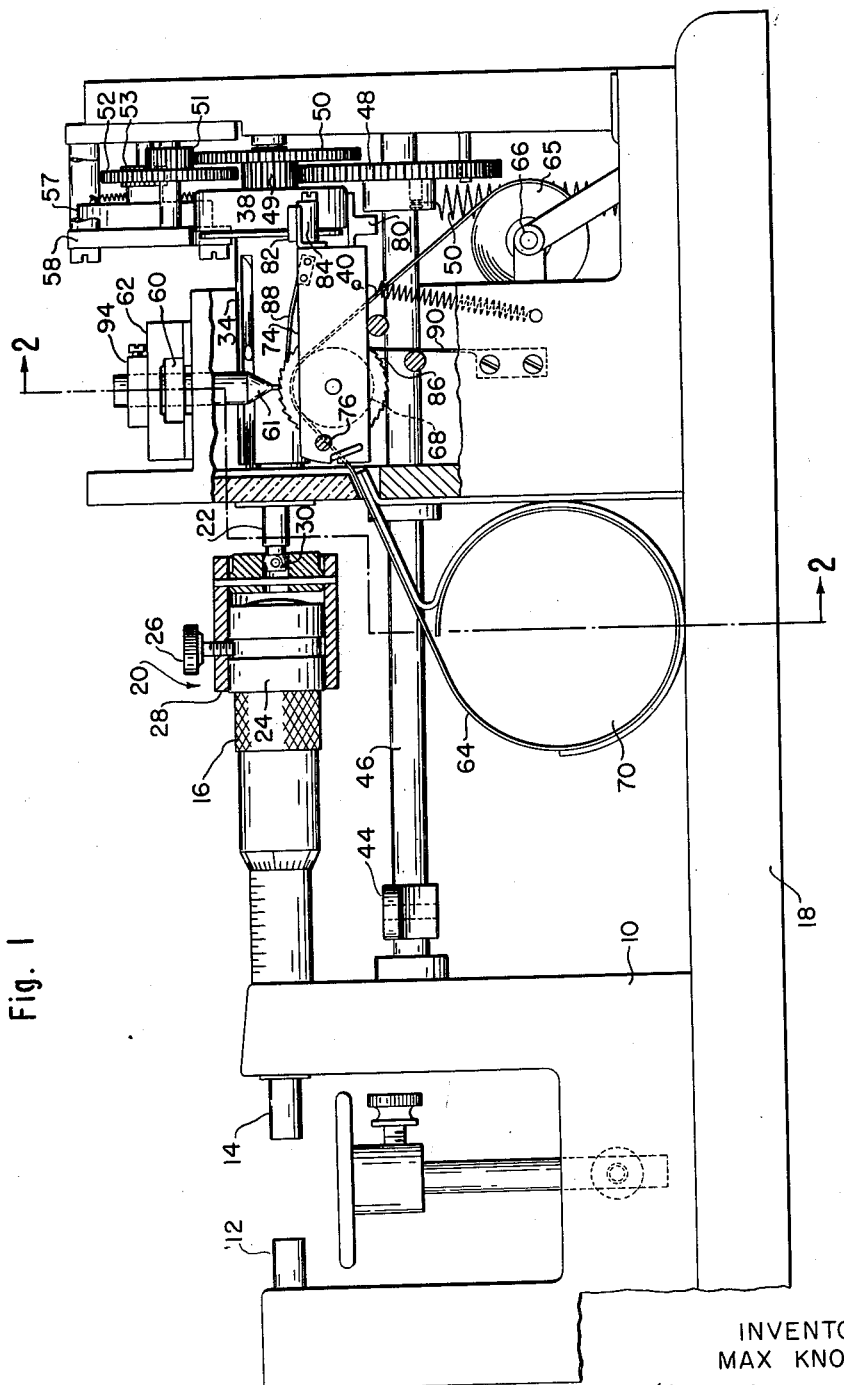

Jan. 6, 1953

M. KNOBEL 2,624,121

MICROMETER MEASURING DEVICE

Filed Nov. 16, 1948

2 SHEETS—SHEET 1

INVENTOR
MAX KNOBEL

BY Kenway, Jenney, Witter
& Hildreth
ATTORNEYS

Jan. 6, 1953 — M. KNOBEL — 2,624,121
MICROMETER MEASURING DEVICE
Filed Nov. 16, 1948 — 2 SHEETS—SHEET 2
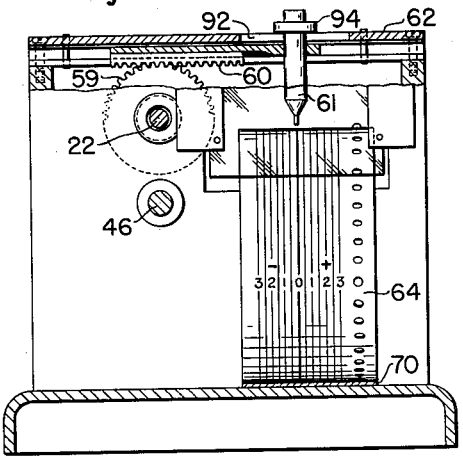
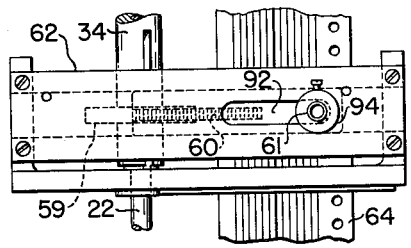
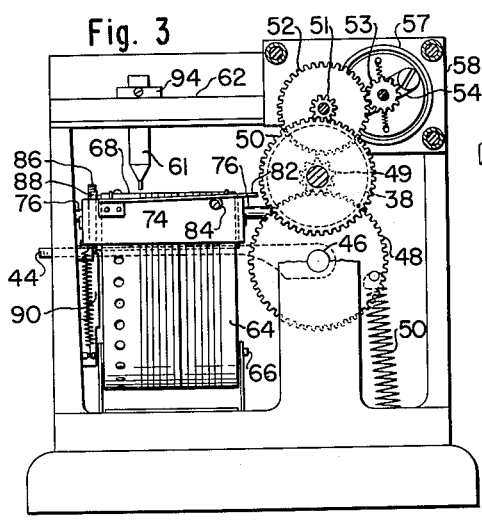
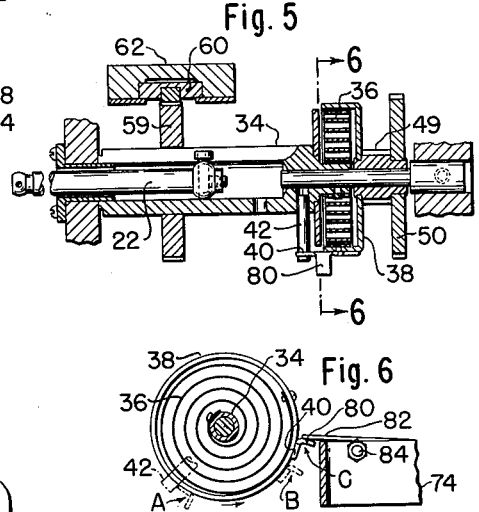
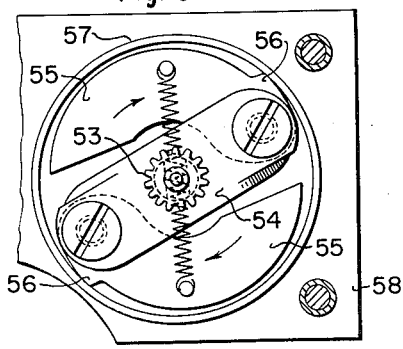
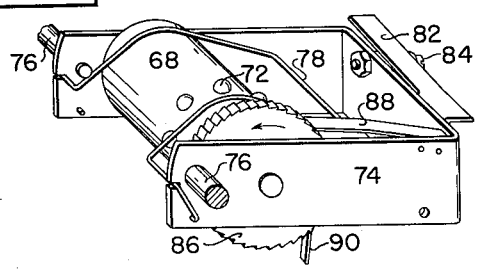
INVENTOR
MAX KNOBEL
BY Kenway, Jenney, Witter & Hildreth
ATTORNEYS Patented Jan. 6, 1953

2,624,121

UNITED STATES PATENT OFFICE 2,624,121

MICROMETER MEASURING DEVICE

Max Knobel, Arlington, Mass., assignor to K T Laboratories, Inc., Boston, Mass., a corporation of Massachusetts Application November 16, 1948, Serial No. 60,259

8 Claims. (Cl. 33—164)

The present invention relates to micrometer measuring devices and more particularly to devices for measuring and recording the dimensions of manufactured articles. This application is a continuation-in-part of my prior application, Serial No. 755,954, filed June 20, 1947, now abandoned.

One of the objects of the present invention is to provide mechanical devices for automatically gaging and recording the dimension of an article. A further object is to provide means adaptable to a micrometer for taking a measurement under uniform pressure conditions.

With these and other objects in view as will hereinafter appear, the present invention makes use of a micrometer, which may be of standard construction, combined with means for mechanically operating the micrometer to bring it into contact with the work, and means for automatically recording the measured dimension of the work.

A further feature of the invention comprises a micrometer combined with means for operating the micrometer under a substantially uniform torque during its engagement with the work.

In its simplest and best form now known, a feature of the invention comprises a coiled spring together with means for permitting a slight yield of the spring under uniform pressure as the micrometer closes on the work. The spring has a large number of turns and the required motion after contact with the work is so small that the micrometer pressure is maintained substantially uniform. A further feature of the invention comprises the combination of said spring with means for operating the micrometer screw at a substantially constant speed, whereby no inaccuracy is introduced by the inertia of the parts. Preferably this means comprises a governor having mass with variable friction damping dependent on speed, whereby upon application of either a small or a relatively large torque, the actual speed of the device is free to vary only within very narrow limits.

Other features of the invention consist of certain novel features of construction and combinations and arrangements of parts hereinafter described and particularly defined in the claims.

In the accompanying drawings, Fig. 1 is an elevation partly in section, of the preferred form of micrometer gage; Fig. 2 is a section on line 2—2 of Fig. 1; Fig. 3 is a rear end elevation, partly in section; Fig. 4 is a detail plan view of the pen operating mechanism; Fig. 5 is a longitudinal sectional view of the driving mechanism; Fig. 6 is a section on line 6—6 of Fig. 5; Fig. 7 is a perspective view, illustrating particularly the paper feed mechanism; and Fig. 8 is an enlarged detail view illustrating the governor.

As shown in Fig. 1, the present invention comprises a screw micrometer 10 of standard construction having the usual anvil 12 and spindle 14, the latter being normally movable by means of a knurled knob 16. The parts are mounted in the usual U-shaped frame which is here shown as mounted on the base 18.

The knob 16 is coupled through a coupling 20 with a shaft 22. The coupling comprises a ring 24 secured to the micrometer knob, the ring having a channel within which may be received the end of a thumb screw 26. The screw 26 is threaded in a cup-shaped sleeve 28 which embraces the ring 24. The shaft 22 is connected with the sleeve by a suitable swivel joint 30, permitting slight angular compensation between the shaft and the micrometer. The usual ratchet is omitted from the micrometer, hence rotation of the shaft 22 is directly utilized to turn the micrometer spindle 14, when the screw 26 is engaged.

The shaft 22 is splined to a hollow shaft 34 whereby, on rotation of the latter, the shaft 22 is rotated to operate the micrometer. The shaft 34 is driven through a spring which is here shown as a barrel spring 36. The inner end of the spring is attached to the end portion of the shaft 34 while the outer end of the spring is secured to the barrel 38. An arm 40 extends forwardly from the barrel to engage a pin 42 extending outwardly from the shaft 34. The relation of the parts 40 and 42 is such that for a forward motion of the spindle 14, the shaft 34 is driven only through the spring 36, while a retracting movement of the spindle is effected by direct contact between the arm 40 and the pin 42. Therefore, on a movement of the spindle 14 toward measuring position which is effected by a clockwise rotation of the barrel 38 looking toward the front (counterclockwise as viewed in Fig. 6), the arm 40 tends to pull away from the pin 42, but since the spring is partially wound and there is no substantial resistance to the motion, these parts usually remain in contact. When the spindle 14 strikes the work, the pin 42 is stopped and the barrel continues its motion. It is contemplated that the spring will have several turns and that the motion of the arm 40 will not usually be greater than a half-turn, so that regardless of the stopping position of the barrel, the pressure on the work will be substantially uniform. It will be understood that uniform measuring pressure is desirable and this action may be accomplished with much greater uniformity than with the ratchets commonly used with micrometers.

The barrel 38 is preferably driven mechanically and to this end there is provided an operating handle 44 mounted on a shaft 46. The shaft 46 drives the barrel 38 through gears 48 and 49. A return spring 50' connected between the gear 48 and the base tends to hold the handle 44 in its uppermost position. The extent of movement of the handle and the gear ratios are preferably such that a full motion of the handle results in a relatively small motion of the spindle 14. It has been found usually sufficient to keep this motion within an overall range of about .006 inch.

Since the pressure of the spindle upon the work depends to some extent on the inertia of the parts, and hence on the speed of operation, a governing device is provided to maintain a substantially constant speed of approach of the spindle 14 toward the work, regardless of the force applied by the operator to the handle. To this end, a gear 50 mounted on the gear 49 drives a gear train composed of a small gear 51, a large gear 52 and a small gear 53, suitably meshed so that the last gear rotates considerably faster than the gear 50. Mounted on the gear 53 is a bracket 54 to which are pivoted two centrifugal weight arms 55, adapted to be moved outwardly in such a manner that the tail portions 56 thereof engage with variable pressure, depending on speed, against the inside surface of a brake drum 57. The drum 57 is formed integral with a plate 58. The gears heretofore mentioned are suitably mounted on shafts journaled in the plate 58 and in suitable brackets in a manner which will be understood by those skilled in the art without further description.

The recording mechanism comprises a gear 59 mounted on the spline shaft 34 to drive a rack 60 on which is mounted a pen 61. The rack is mounted for lateral sliding motion in a suitable guide 62. This gives a linear motion to the pen and avoids the necessity of using a paper with arcuate markings. The finished dimension, or rather its departure from standard, is indicated by the pen on a paper chart shown at 64 in Fig. 2. The paper is preferably fed from a suitable roll 65 which is mounted on spindle 66. The paper passes over a feed-roll 68 to be discharged into a receptacle 70.

As shown in Fig. 7, the feed-roll 68 is provided with pins 72 to be received in suitable holes in the chart paper. The roll is mounted in a yoke 74 which is pivoted on studs 76 journaled in the frame. The paper is normally held in engagement with the roll by means of a curved wire spring member 78 which conforms at the front to the shape of the roll and at the rear is shaped to overlie the paper and assure its proper engagement by the pins 72.

The entire yoke 74 is rocked about the pivot 76 to bring the paper up into contact with the pen. This action occurs at the limit of movement of the handle 44 and is effected by a finger 80 which extends outwardly from the operating arm 40 on the barrel 38. The finger 80 is adapted to engage a plate 82 mounted on the rear of the yoke. The plate 82 is preferably a stiff leaf spring which extends laterally from the yoke in the path of the finger 80. It is possible to arrange the construction so that the pin 40 will engage the yoke directly but it is preferred to drive the yoke through the spring 82 in order to provide a cushion if motion of the yoke should be resisted. As shown in Fig. 7, the spring is normally flexed and rests upon a pin 84 secured in the back of the yoke.

In Fig. 6, several positions of the arm 40 are shown in phantom. The arm is at its rest position at A, the pin 42 being then in contact with it. The approximate limit of a measuring movement is indicated at B; when the part 40 is at B, the pin 42 may be at any point between A and B depending on the work size. For a piece of minimum size the pin 42 will follow to position B and the pen will then overlie the left-hand part of the chart. The angular motion between A and B is about 0.3 revolution for a measuring range of 0.006 inch (that is, ±0.003 inch from standard). The additional motion from B to the full line position C represents completion of the motion of the handle and is utilized for engagement with the spring 82 to lift the yoke for engagement of the paper with the pen. The total angular motion of the part 40 need not be more than about four-tenths of a revolution.

The upward motion of the yoke about the pivot 76 is also utilized to advance the paper. To this end the feed-roll 68 is provided with a ratchet 86. A spring pawl 88 on the yoke and a detent pawl 90 on the frame engage the teeth of the ratchet, whereby each rocking motion of the yoke causes rotation of the ratchet by one tooth and thus effects an advance of the paper chart.

As shown in Figs. 2 and 8, the pen 61 comprises a tube which may be filled with heavy ink. The pen is secured in a suitable opening in the rack 60 and extends upwardly through a slot 92 in the upper guide 62, the pen being held in place by a collar 94 secured to the pen by a suitable set-screw. The ends of the slot determine the limits of movement of the pen.

As shown in Fig. 2, the chart 64 is provided with longitudinal lines indicating the standard dimension and departures therefrom up to ±0.003 inch. The chart, therefore, gives a charted record of variations from standard. The measurements may be readily interpolated to ten-thousandths.

To operate the apparatus, it is first necessary to adjust the parts to conform to the standard dimension. The handle 44 is set so that the pen 60 is directly over the zero line of the chart as indicated in Fig. 5. The coupling member 24 is uncoupled by loosening the thumb screw 26 and the micrometer is set up by means of the knurled head 16 until the micrometer reads the correct dimension. If desired, the micrometer may be brought up to engagement with a work piece of standard size. The coupling member is then secured by means of the screw 26. It is then desirable to check with a work piece of standard dimensions by actual operation of the handle in order that pressure may be applied through the spring 36, and another adjustment of the coupling device may be necessary. In any event, the parts are brought into position such that when a piece of correct dimensions is inserted and the handle is operated to bring the micrometer up to the work, the pen 60 will exactly overlie the zero line of the chart for a work piece of correct dimension. When the handle is released, the part 40 assumes position A of Fig. 2, the micrometer opens to its maximum oversize position, and the pen 60 is moved to a point over the right-hand line of the chart. After retracting the handle, a new work piece may be introduced. The apparatus operates to engage the work with standard pressure and to record the exact deviation of the measurement from standard.

It will be observed that the measurement is effected under substantially uniform pressure. As heretofore noted, the total motion of the spring is about four-tenths of a revolution. The point at which the arm 40 breaks away from contact with the pin 42 depends on the size of the work piece, but within the range here indicated, it will occur between A and B, namely, within a range of three-tenths of a revolution. Since the spring has several convolutions and is initially under some winding torsion, the possible variation of torque within this range is negligible. Furthermore, the substantial constancy of speed effected by the governor assures uniformity of inertia effects, and the measurements may therefore be considered as made under substantially uniform micrometer pressure. It will be noted that an advancing movement of the screw is effected only through the spring, whereas a retracting movement is effected through actual engagement of the coacting members 40 and 42; this is important since the torque required to overcome frictional engagement between the micrometer and the work is usually greater than the torque applied in setting the micrometer up to the work.

The apparatus may be used for gaging or measuring work in any way, but is preferably used in such a manner that every piece, or at least samples selected at frequent regular intervals, are gaged, whereby the trend of manufacturing operations may be observed. Thus, if the operations are being carried out properly, the record will show a series of marks closely grouped around the zero line. Variations within tolerable limits but varying from plus to minus indicate some looseness in the machine tools, which should be corrected. If the record veers toward one side or the other, it indicates tool wear or some similar condition which requires correction. A record of this type therefore shows incipient errors that can usually be corrected before the deviations exceed tolerable limits. The invention may also be used with a continuous paper drive, the feed roll 68 being then continuously driven by a motor. If the marks are spaced with substantial uniformity, the record indicates that all of the pieces have been gaged, and thus a check on the workman's operations is provided.

It will be understood that the invention is not limited to the precise construction herein shown and described but may be varied as to size of parts, and range of measurement, and in other respects within the purview of the appended claims.

Having thus described the invention, I claim:

1. A measuring device comprising a micrometer including a frame and a spindle threaded in the frame, a shaft, coupling engaging the spindle and the shaft, a coiled stressed torsion spring connected to said shaft, a rotatable member connected to said spring, means for rotating said member to transmit torque through said spring to said shaft, and interengaging stops mounted on said shaft and member to prevent relative rotation thereof in one direction, whereby said shaft and spindle may be driven in one direction solely through said spring and in the reverse direction without employing the spring.

2. A measuring device comprising a micrometer including a frame and a spindle threaded in the frame, a shaft, a coupling engaging the spindle and the shaft, an indicator slidably mounted adjacent the shaft, means mechanically coupling the indicator to the shaft to move the indicator in response to variation in the angular position of the shaft, a coiled stressed torsion spring connected to said shaft, a rotatable member connected to said spring, means for rotating said member to transmit torque through said spring to said shaft, and interengaging stops mounted on said shaft and member to prevent relative rotation thereof in one direction.

3. A measuring device comprising a micrometer including a frame and a spindle threaded in the frame, a shaft, a coupling engaging the spindle and the shaft, means for locking and unlocking the coupling to connect and disconnect the spindle from the shaft, a coiled stressed torsion spring connected to said shaft, a rotatable member connected to said spring, means for rotating said member to transmit torque through said spring to said shaft, and interengaging stops mounted on said shaft and member to prevent relative rotation thereof in one direction, whereby said shaft and spindle may be driven in one direction solely through said spring and in the reverse direction without employing the spring.

4. A measuring device comprising a micrometer including a frame and a spindle threaded in the frame, a shaft, a coupling engaging the spindle and the shaft, a coiled stressed torsion spring connected to said shaft, a rotatable member connected to said spring, means for rotating said member to transmit torque through said spring to said shaft, a centrifugal speed governor controllably connected to said member and interengaging stops mounted on said shaft and member to prevent relative rotation thereof in one direction, whereby said shaft and spindle may be driven in one direction solely through said spring and in the reverse direction without employing the spring.

5. A measuring device comprising a micrometer including a frame and a spindle threaded in the frame, a shaft, a coupling engaging the spindle and the shaft, means for locking and unlocking the coupling to connect and disconnect the spindle from the shaft, a coiled stressed torsion spring connected to said shaft, a rotatable member connected to said spring, means for rotating said member to transmit torque through said spring to said shaft, a centrifugal speed governor controllably connected to said member and interengaging stops mounted on said shaft and member to prevent relative rotation thereof in one direction, whereby said shaft and spindle may be driven in one direction solely through said spring and in the reverse direction without employing the spring.

6. The structure defined in claim 4 wherein the centrifugal speed governor comprises a casing, a circular brake band mounted on the casing, a plurality of weights pivotally mounted to swing within the casing to and from said brake band, and means coupling said casing for rotation with said shaft.

7. A measuring device comprising a micrometer including a frame and a spindle threaded through said frame, a shaft, a coupling engaging the spindle and said shaft, means for locking and unlocking the coupling to connect or disconnect the shaft from the spindle, a pinion secured to the shaft, a rack engaging the pinion, a working device mounted on the rack and directed downwardly therefrom, means for rotating the shaft, a reel disposed beneath the rack, a yoke mounted for rotation about a horizontal axis disposed beneath said rack, a feed roll mounted in said yoke, and means mechanically connected to said shaft and yoke for intermittently rocking said yoke upwardly about said horizontal axis as said shaft turns, whereby paper may be drawn from said reel over said feed roll and intermittently moved into contact with said working device.

8. A measuring device comprising a micrometer including a frame and a spindle threaded through the frame, a shaft, a coupling connecting the shaft to the spindle, a cylindrical casing mounted for rotation co-axially with the shaft, a coiled stressed torsion spring disposed within the casing and connected at its inner end to the shaft and at its outer end to the casing, a rock shaft, a first gear secured to said rock shaft, a second gear fixed to said casing and meshed with said first gear, and a lever secured to said rock shaft, whereby said lever may be actuated to turn said gears and said casing and thereby transmit torque through said spring to said shaft, coupling and spindle.

MAX KNOBEL.

REFERENCES CITED

The following references are of record in the file of this patent:

UNITED STATES PATENTS

| Number | Name | Date |
|---|---|---|
| 454,391 | Verstraete | June 16, 1891 |
| 1,108,993 | Joriot | Sept. 1, 1914 |
| 1,849,447 | Basque | Mar. 15, 1932 |
| 2,031,247 | Bischof | Feb. 18, 1936 |
| 2,075,754 | Williams | Mar. 30, 1937 |
| 2,336,695 | Maurer | Dec. 14, 1943 |

FOREIGN PATENTS

| Number | Country | Date |
|---|---|---|
| 190,459 | Switzerland | June 16, 1937 |
| 530,891 | England | Dec. 24, 1940 |
| 878,607 | France | Oct. 19, 1942 |